United States Patent [19]
Iida et al.

[11] Patent Number: 5,751,420
[45] Date of Patent: May 12, 1998

[54] SPECTROPOTOMETER WITH A FIELD RESTRICTOR AND ITS APPLICATION TO A COLORIMETER

[75] Inventors: Atsuhiro Iida, Nagaokakyo; Kazumi Yokota, Neyagawa; Eiji Ikeda, Nagaokakyo; Tomoki Sasayama, Kyoto, all of Japan

[73] Assignee: Shimadzu Corporation, Kyoto, Japan

[21] Appl. No.: 769,269

[22] Filed: Dec. 18, 1996

[30] Foreign Application Priority Data

Dec. 21, 1995 [JP] Japan ................. 7-350320

[51] Int. Cl.$^6$ .................... G01J 3/04; G01N 21/27
[52] U.S. Cl. .................................... 356/328
[58] Field of Search .................. 356/328, 334; 359/380

[56] References Cited

U.S. PATENT DOCUMENTS

| | | | |
|---|---|---|---|
| 3,527,536 | 9/1970 | Alpen | 356/72 |
| 3,740,147 | 6/1973 | Kallet | 356/334 X |
| 4,119,364 | 10/1978 | Takahashi | 359/380 X |
| 4,917,492 | 4/1990 | Koishi | 356/328 X |
| 5,301,007 | 4/1994 | Ukon | 356/326 |
| 5,497,267 | 3/1996 | Ishikawa et al. | 359/380 |

FOREIGN PATENT DOCUMENTS

| | | |
|---|---|---|
| A-1-201123 | 8/1989 | Japan. |
| A-3-131742 | 6/1991 | Japan. |

OTHER PUBLICATIONS

Mutter et al "Spot Locator for Microscopis Spectrophotometer" IBM Tech. Disc. Bull. vol. 21, #6, pp. 2456–2459, Nov. 1978.

Kazuo Yamaba et al., "Neuberger Memorial Seminar on Color Reproduction", vol. 1184, Dec. 14–15, 1989, pp. 168–176.

*Primary Examiner*—Vincent P. McGraw
*Attorney, Agent, or Firm*—Oliff & Berridge, PLC

[57] ABSTRACT

A zoom lens is provided between the sample and the slit of a spectrophotometer to change the size of the image of the sample on the slit plane. The picture of the sample is taken by the zoom lens and is shown on a display screen, on which a window is superimposed. When the operator changes the location of the window, the sample is moved accordingly, and when the operator changes the size of the window, the focal length of the zoom lens is changed, whereby the size of the measurement area is changed. By changing the size of the measurement area on the slit plane while the size of the elementary photo-sensors of a photo-detector is unchanged, the resolution of the two-dimensional spectrophotometry can be changed.

9 Claims, 5 Drawing Sheets

SPECTROPOTOMETER WITH A FIELD RESTRICTOR AND ITS APPLICATION TO A COLORIMETER

The present invention relates to a spectrophotometer that measures a two-dimensional area or a rather broad area of a sample surface. Such a spectrophotometer is used in an area analyzer, in a colorimeter, etc.

BACKGROUND OF THE INVENTION

A colorimeter using a two-dimensional spectrophotometer is illustrated in FIG. 7. Light emitted from a lamp 11 is reflected by the surface of a sample 2 placed on a sample stage 1, and passes through a slit 12 extending in the Y-direction. The light passing through the slit 12, which corresponds to a linear portion extending in the Y-direction on the sample surface, is collimated by a lens 13 and is separated with respect to the wavelength by a diffraction grating 14. The separated light passes through a harmonics-eliminating filter 15 and is cast on a photo-detector 17 by a lens 16. The photo-detector 17 is composed of two-dimensionally-arrayed tiny photo-sensors, where one dimension in the Y-direction corresponds to the linear portion of the sample surface and the other dimension in the $\lambda$-direction corresponds to wavelength of the separated light coming from every elementary area of the linear portion. That is, a spectral image representing the collection of the spectra of the linear portion of the sample 2 is cast on the photo-detector 17.

While an optical system 10 including the lamp 11, diffraction grating 14 and photo-detector 17 is moved by a motor (not shown) intermittently in the X-direction, which is perpendicular to the linear portion in the Y-direction, the spectral images of the linear portions are respectively obtained. Instead of moving the optical system 10, the sample stage 1 may be moved in the X-direction. When a preset distance is moved, spectra of the elementary areas constituting the two-dimensional area swept by the linear portion on the sample surface are obtained. The photo-intensity data constituting the spectra of the two-dimensional area is processed in a personal computer 20 to determine the color of every elementary area. The results of the data processing are shown on the screen of a display device 21 or given out from a printer 22.

When a high-precision color measurement is needed in a colorimeter as constructed above, the spectral image on the photo-detector 17 should have a high contrast. The contrast of the spectral image deteriorates, however, as the pattern cast on the photo-detector 17 becomes finer, because the color of an elementary area is influenced by the colors of the neighboring elementary areas due to aberrations of the lenses included in the optical system and other miscellaneous factors. Thus an adequately coarse pattern should be set to perform a color measurement of a desired high precision. In other words, the resolution of the colorimeter, which means how fine a pattern can be measured by the colorimeter, is determined by the precision of the color measurement desired. Some samples have coarse color patterns and other samples have fine color patterns. It is impossible therefore with a conventional colorimeter to measure color of various samples having diverse patterns at an appropriate precision, or at a fixed precision.

SUMMARY OF THE INVENTION

An object of the present invention is therefore to provide a colorimeter which can measure color of samples having various patterns with an appropriate precision.

Another object is to provide a two-dimensional spectrophotometer which can be used with a variable spacial resolution and that can be used in such a colorimeter.

Thus a first type of spectrophotometer according to the present invention includes:

a light source or a lamp for casting a light on a sample;

a focusing element having a variable focal length for focusing the light from the sample on a focal plane;

a restrictor such as a slit or an aperture plate placed on the focal plane for restricting an area of the light focused on the focal plane;

a spectral element such as a diffraction grating or a prism for separating the light coming from the restrictor with respect to wavelength; and a photo-detector including a plurality of elementary photo-sensors for measuring the light separated by the spectral element.

The focusing element here may be a zoom lens whose focal length is continuously variable, or a lens unit whose focal length is changed stepwise. An exchangeable lens unit including a plurality of lenses of different focal lengths may be used, where the focal length of the focusing element is changed by placing an appropriate lens in the optical path.

The light from the light source is reflected by the sample surface, or transmitted through the sample, and is focused by the focusing element on the focal plane where the restrictor is placed. When a slit is used as the restrictor, the width of the light beam is restricted and the light is separated widthwise with respect to the wavelength by the spectral element. The separated light is measured by the elementary photo-sensors of the photo-detector. Thus spectra of elementary areas within a portion of the sample surface corresponding to the restrictor (a slit in this case) are obtained. While the sample is moved with respect to the optical system including the light source, focusing element, restrictor, etc., the above measurement is repeated. After a preset measurement area on the sample surface is finished, spectra of the measurement area are collected.

By changing the focal length of the focusing element, the size of the measurement area formed on the focal plane changes while the size of the elementary photo-sensors is unchanged. This enables measurements of both fine patterns and coarse patterns. That is, when a sample having coarse or large pattern is to be measured, the focusing element is set at a wide angle to cast a broader area on the focal plane. When, on the other hand, a sample having fine or small pattern is to be measured, the zoom lens is set at a telephoto position to conduct a precise measurement at high resolution.

The second type of spectrophotometer according to the present invention includes:

a light source for casting a light on a sample;

a focusing element for focusing the light from the sample on a focal plane;

a restrictor placed on the focal plane for restricting an area of the light from the focusing element;

a spectral element for separating the light coming from the restrictor with respect to wavelength;

a photo-detector including a plurality of elementary photo-sensors for measuring the light separated by the spectral element; and a moving mechanism for changing the distance between the sample and an optical system including the light source, the focusing element, the restrictor, the spectral element and the photo-detector.

In this type, the moving mechanism changes the size of the measurement area cast on the focal plane by changing the distance between the sample and the focusing element which is equivalent to changing the focal length of the focusing element. Thus the same effect as described above for the first type can be obtained.

The third type of spectrophotometer according to the present invention includes:

a light source for casting a light on a sample;

a focusing element for focusing the light from the sample on a focal plane;

a variable restrictor placed on the focal plane for restricting the area of light from the focusing element wherein the shape of the area is variable;

a spectral element for separating the light coming from the variable restrictor with respect to wavelengths; and a photo-detector including a plurality of elementary photo-sensors for measuring the light separated by the spectral element.

The size of the measurement area is not changed in this type, but the shape of the restrictor is changed. The spectrophotometer of this type is used to measure a rather small area in which a spectrophotometry is performed as a whole, so that the measurement result represents the property of the whole measurement area. The variable restrictor in this case is used to select a desired measurement area, or to mask unnecessary area, on the sample surface. Color measurement or chemical analysis on an irregularly shaped area can be performed with this type of spectrophotometer.

DETAILED DESCRIPTION OF PREFERRED EMBODIMENTS

[EMBODIMENT 1]

Figure 1:
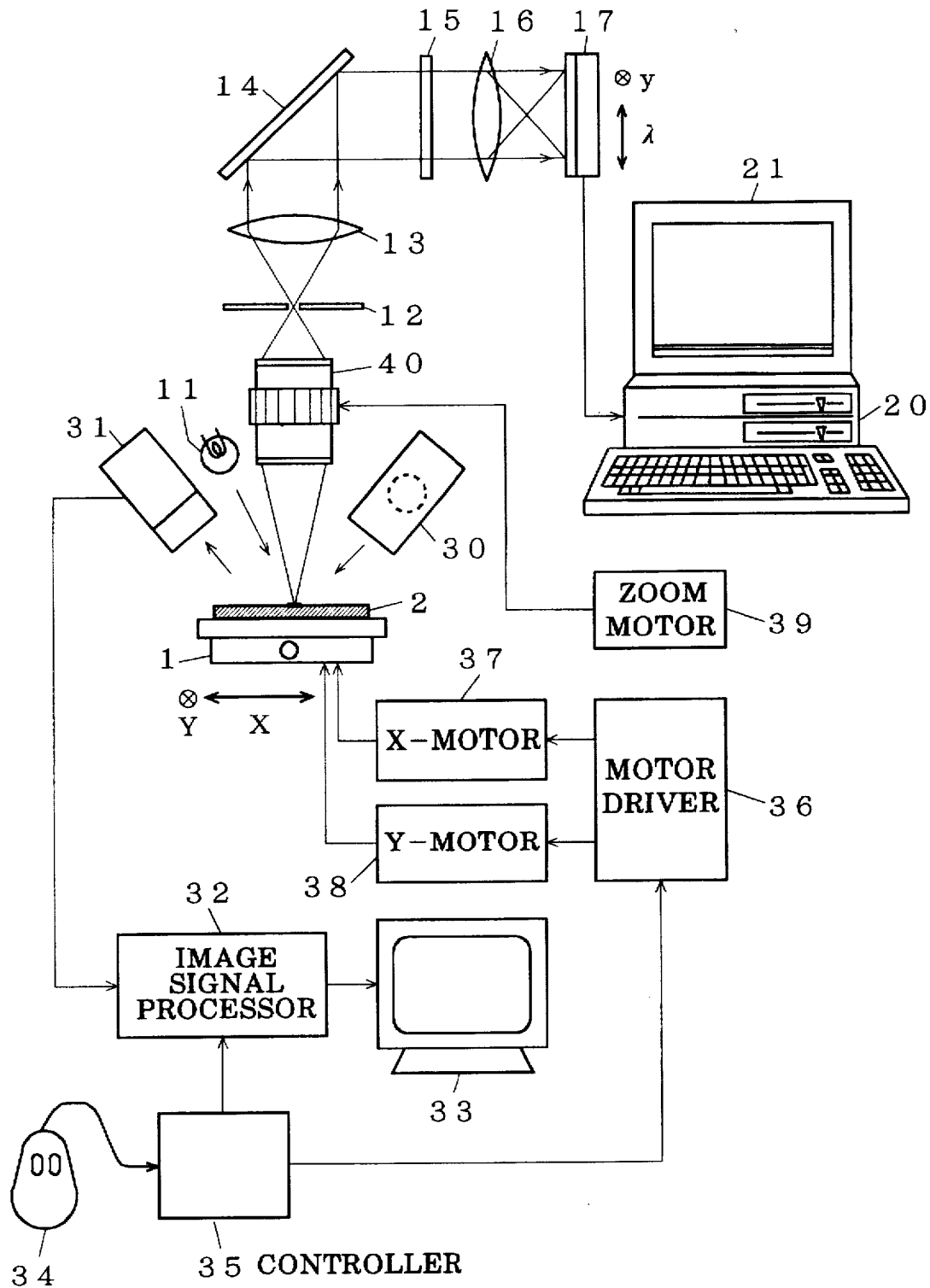
FIG. 1 is a schematic diagram of a colorimeter of EMBODIMENT 1.

FIG. 1 shows an abstract structure of a colorimeter embodying the first type of the present invention. The colorimeter of this embodiment is characterized by a zoom lens 40 placed on the optical path between a sample 2 and a slit 12. A lamp 30 provided for a sample picturing illuminates the sample 2, and a CCD camera 31 takes a picture of the whole or a part of the sample 2. The image signal of the sample picture is sent to an image signal processor 32 where the signal is converted to a set of image data and stored in a frame memory provided in it. Various image processing may be made on the image data of the sample picture in the image signal processor 32, such as noise filtering, edge emphasis, color correction, etc. An image superimposing is also performed here to make a window display as described later. The image data processed in the image signal processor 32 is sent to a display device 33 where the picture of the sample surface is shown on the display screen 33.

When a mouse 34 is operated, a signal corresponding to the operation is sent to a controller 35. The controller 35, which is composed of a CPU, ROM, RAM, etc., processes the signal, and generates and sends control signals to the image signal processor 32 and a motor driver 36 according to the operation of the mouse 34, as described later. Responsive to the control signals, the motor driver 36 drives an X-axis motor 37, Y-axis motor 38 and a zooming motor 39 to move a sample stage 1 and a zoom lens 40.

A process of a color measurement on the above colorimeter is now described. First a sample 2 is put on the sample stage 1, and the operator adjusts the zoom lens (not shown) of the CCD camera 31 to show the picture of the whole sample 2 on the screen of the display device 33. When the object of the measurement is a part of the sample surface, the zoom lens is adjusted to show the part enlarged on the display screen 33. After the zoom lens of the CCD camera 31 is adjusted, the operator operates a keyboard (not shown) of the controller 35 to give a command "freeze the picture". When the controller 35 receives the command, it stops storing image data to the frame memory in the image signal processor 32, whereby the picture on the display screen 33 is freezed.

Figure 2A:
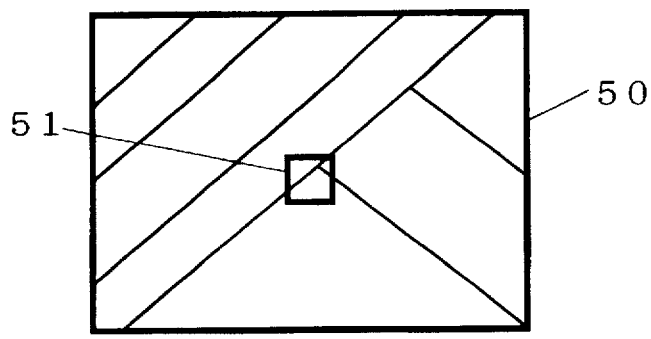
FIGS. 2A and 2B show examples of display on a display screen.

The controller 35, on the other hand, creates image data of a frame including a window. Here the window is a rectangle which will be superimposed on the picture of the sample 1 in the display screen 33. The image data of a frame including the window is sent to the image signal processor 32. In the initial state where the mouse 34 is not yet operated, a window of a preset size is placed at the center of the display screen 33. When the mouse 34 is moved, the window is moved on the display screen 33 accordingly, and when either of two switches on the mouse is depressed, the size of the window is enlarged or shrunk by a preset amount. It is possible to use the mouse 34 according to the standard usage of the Windows Operating System, i.e., to drag the periphery of the window to change the size of the window. The image signal processor 32 superimposes the image data of the frame from the controller 35 on the image data stored in the frame memory, whereby the window 51 is shown superimposed on the picture 50 of the sample 2 in the display screen 33, as shown in FIG. 2A. As described later, the window 51 indicates the area in which a spectral measurement is performed automatically.

Figure 2B:
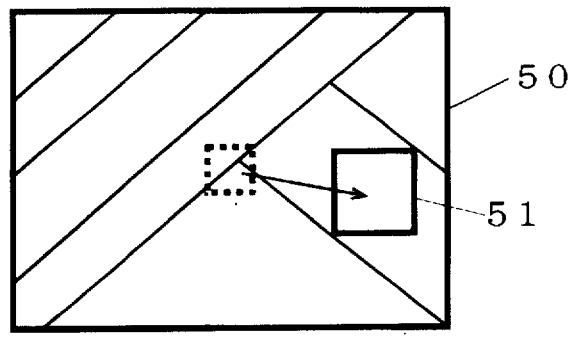

Looking at the picture 50 on the display screen 33, the operator operates the mouse 34. The controller 35 creates the image data of a frame including a window 51 that has the size and location according to the operation of the mouse 34, and sends the image data to the image signal processor 32 at every preset short time interval. Every time the image data comes from the controller 35, the image signal processor 32 superimposes the image data on the image data of the sample picture stored in the frame memory, and refreshes the image on the display screen 33. Thus the picture on the display screen 33 is changed as shown in FIG. 2B where only the size and location of the window 51 are changed while the picture 50 of the sample surface is unchanged.

Meanwhile, based on the information of: the position of the zoom lens 40 of the CCD camera 31 at the time the sample picture is freezed, the position of the sample stage 1 at the time the sample picture is freezed, and the initial condition of the zoom lens 40, a place in the picture shown on the display screen 33 and an actual place on the sample surface can be correlated. Then, a movement of the sample stage 1 is calculated from the movement of the window 51 on the display screen 33, and an adjusted position of the zoom lens 40 is calculated from the size of the window 51. Thus the controller 35 calculates the X-directional and Y-directional movements of the sample stage 1 based on the signal from the mouse 34, and sends commands to the motor driver 36. The controller 35 further calculates the direction (i.e., enlargement or shrinkage) and the adjusting amount of the zoom lens 40 based on the number of depressions of the switches of the mouse 34, and sends commands to the motor driver 36. Receiving the commands, the motor driver 36 sends driving signals to the X-axis motor 37 and Y-axis motor 38 to move the sample stage 1 according to the movement of the mouse 34, and sends a driving signal to the zooming motor 39 to set the zoom lens 40 at the adjusted position. Thus, when the mouse 34 is operated, the sample stage 1 moves horizontally to trace the movement of the mouse 34, and the area to be measured comes under the optical system 10.

After locating the window 51 at a desired place in the sample picture on the display screen 33 using the mouse 34, the operator operates the keyboard or the mouse 34 to give a command for starting a spectral measurement. Receiving the command, the controller 35 starts a spectral measurement in the selected area of the sample surface corresponding to the window 51. The process of the spectral measurement is as described before. That is, after a linear portion of the selected area is measured, the sample stage 1 is moved a preset small distance (which is normally set equal to the resolution in the X-direction) by the X-axis motor 37 and the next linear portion neighboring the previous linear portion is measured. After the measurements are repeated and the selected area is cleared by the linear portions, the data sent to the personal computer 20 is processed and colors of respective elementary areas are determined. While the spectral measurement is performed, signals from the mouse 34 are ignored. When the spectral measurement is completed, signals from the mouse 34 are duly processed.

In the above description, the size of the measurement area on the sample surface is changed by changing the focal length of the zoom lens 40. The focal length of the zoom lens 40 may be changed continuously or stepwise.

[EMBODIMENT 2]

Figure 3:
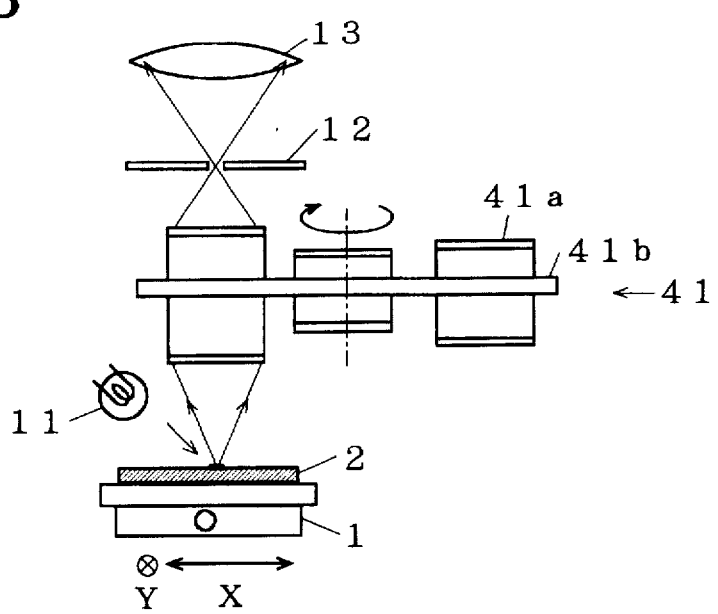
FIG. 3 is a schematic diagram of the optical system of EMBODIMENT 2.

FIG. 3 shows the optical system of a spectrophotometer embodying the second type of the present invention. Instead of the zoom lens 40 used in EMBODIMENT 1, a lens exchanging mechanism 41 is used with a plurality of lenses 41a mounted on a rotating disk 41b. A motor (not shown) is provided to rotate the disk 41b in place of the zooming motor 39 in EMBODIMENT 1. When the operator operates the mouse 34 and changes the size of the window 51, a command is given from the controller 35 to the driver of the disk motor to select a lens 41a having an appropriate focal length corresponding to the size of the window 51. Receiving the command, the motor driver rotates the disk 41b to set the selected lens on the optical path between the sample 2 and the slit 12.

[EMBODIMENT 3]

Figure 4:
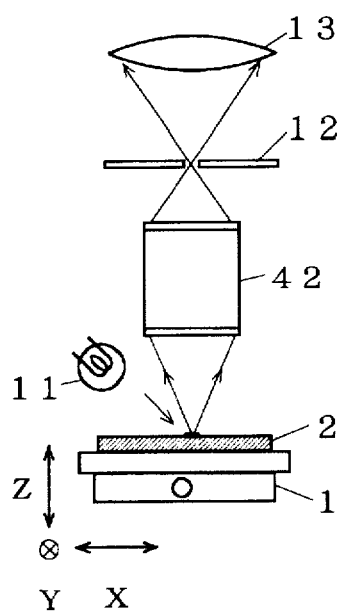
FIG. 4 is a schematic diagram of the optical system of EMBODIMENT 3.

FIG. 4 shows the optical system of a spectrophotometer embodying the third type of the present invention. In this embodiment, the object lens 42 between the sample 2 and the slit 12 is fixed while the sample stage 1 is moved in the Z-direction, whereby the size of the measuring area on the sample surface is changed. For moving the sample stage 1 in the Z-direction, a linear motor (not shown) is provided to the sample stage 1 instead of the zooming motor 39 in EMBODIMENT 1. The controller 35 calculates the amount of the Z-directional movement of the sample stage 1 corresponding to the size of the window 51 changed by the operation of the mouse 34. When a command signal representing the movement is given from the controller 35 to the driver of the linear motor, the sample stage 1 is moved in the Z-direction, as well as in the X- and Y-directions, to set the measuring area as desired. It is of course equivalent to move the optical system instead of the sample stage 1 with respect to the present effect.

Since, in any of the preceding embodiments, the resolution in the X-direction is determined by the width of the slit 12, a slit-width changing mechanism should be provided when the resolution in the X-direction and in the Y-direction is to be equalized.

The colorimeter or spectrophotometers described above in the EMBODIMENTS 1–3 measure a two-dimensional area composed of tiny elementary areas. Whereas, the present invention can also be applied to such a colorimeter or spectrophotometer that measures a unitary area of a desired location and of a desired size as a whole. If, in EMBODIMENT 1 for example, the focal length of the zoom lens is adjusted to take the light of a broad area, an average color of the broad area is obtained. If, on the other hand, the zoom lens is adjusted to take the light of a narrow area, the color of the precise spot is obtained.

[EMBODIMENT 4]

Figure 5:
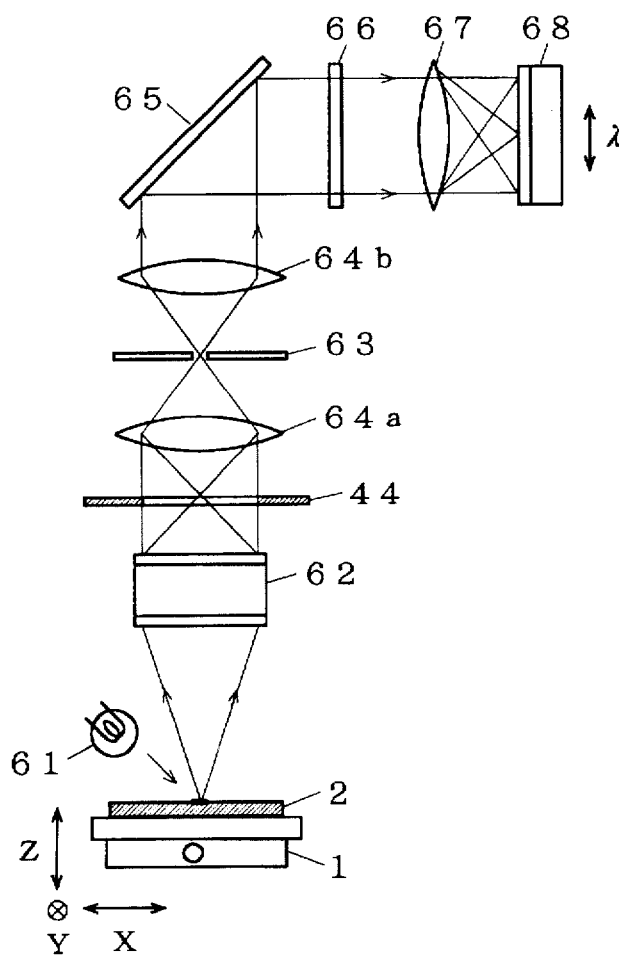
FIG. 5 is a schematic diagram of the optical system of EMBODIMENT 4.

In the above case where the spectrophotometer is designed to measure a small area as a whole, an area having an irregular shape can be measured by adopting the construction as follows. FIG. 5 shows the optical system of a spectrophotometer embodying the fourth type of the present invention. In the optical system are included: a lamp 61 to illuminate a sample 2 at a desired spot diameter; an object lens (first lens) 62 of a fixed focal length; a mask 44 to restrict the area of light into a desired shape; a slit 63; a second lens 64a to converge the light to the slit 63; a third lens 64b to converge the light passing through the slit 63; a diffraction grating 65 to separate the light in wavelength; a harmonics-eliminating filter 66; a fourth lens 67; and a photo-detector 68 composed of tiny photo-sensors arrayed linearly in a λ-direction. The sample stage 1 (or the optical system instead) is movable in the X-, Y- and Z-directions as in EMBODIMENT 3, whereby an area of a desired size at a desired location on the sample surface can be measured.

Figure 6A:
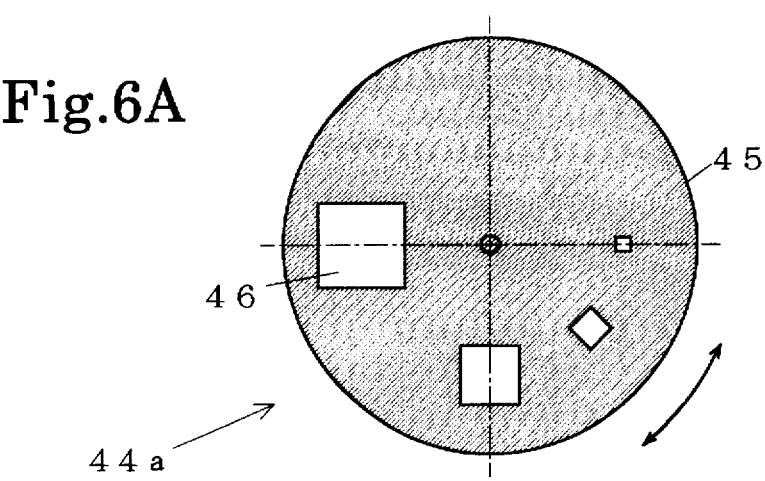
FIGS. 6A–6C show examples of masks used in EMBODIMENT 4.
Figure 6B:
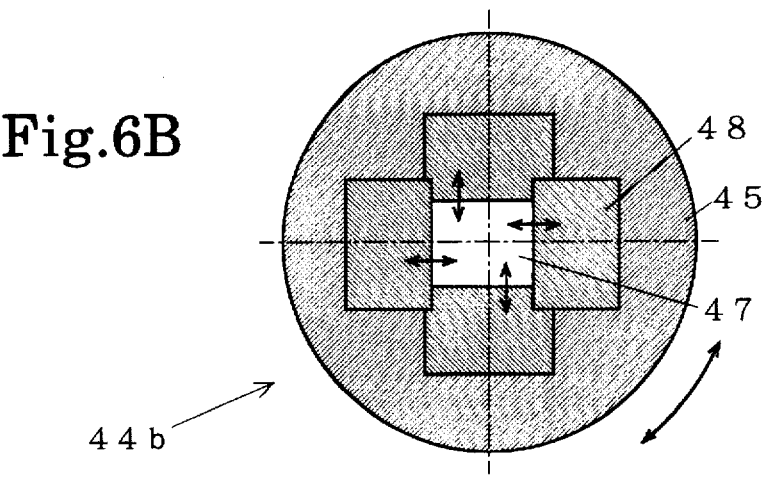
Figure 6C:
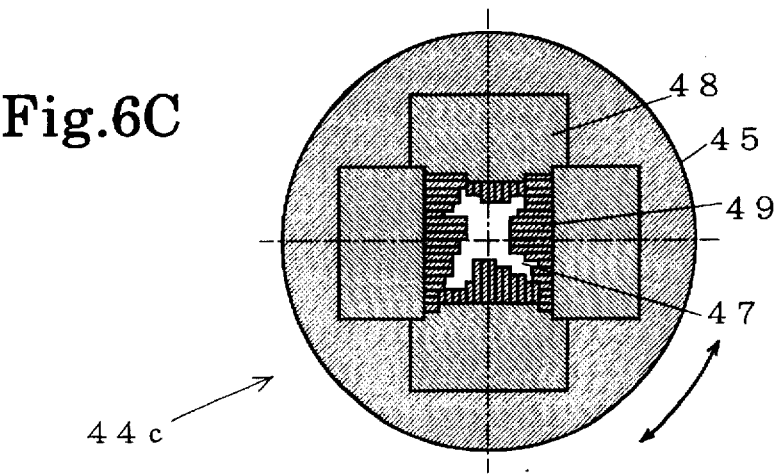
Figure 7:
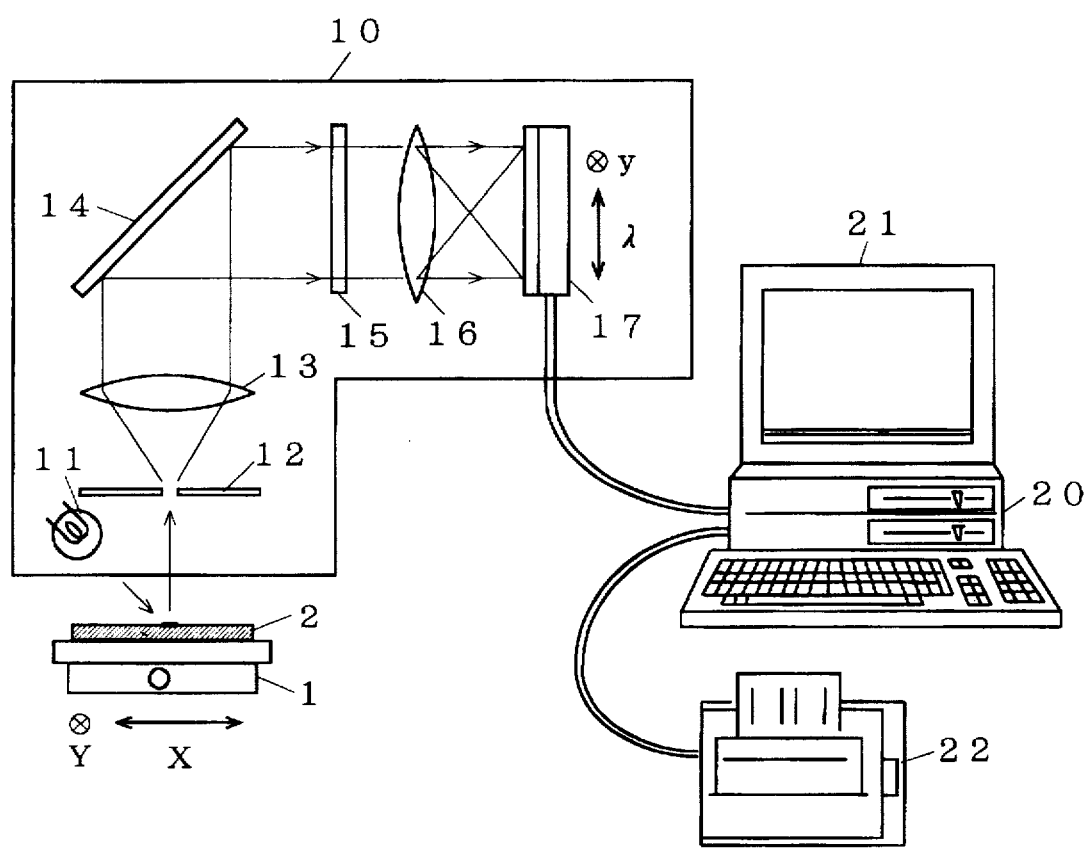
FIG. 7 is a schematic diagram of a conventional colorimeter.

Examples of the mask 44 are shown in FIGS. 6A–6C. FIG. 6A shows a mask 44a by a disk 45 with a plurality of apertures 46 of different size. When the disk 45 is rotated on its center, the center of every aperture 46 comes on the optical axis of the object lens 62.

FIG. 6B shows a mask 44b by a disk 45 with a variable aperture 47. The size of the aperture 47 is changed by moving four blades 48 constituting the four sides of the aperture 47. By adopting a blade tilting mechanism, the aperture 47 can be made rhomboid or trapezoid.

FIG. 6C shows a mask 44c by which an aperture 47 of an irregular shape can be formed. An array of small laths 49 are arranged in parallel on every blade 48 of FIG. 6B, where each lath 49 can be moved independently. Thus an area of any desired shape can be measured by using the mask 44c of this type.

What is claimed is:

1. A spectrophotometer, comprising:
   a light source for casting a light on a sample;
   a focusing element having a variable focal length for focusing the light from the sample on a focal plane;
   a restrictor placed on the focal plane for restricting an area of the light focused on the focal plane;
   a spectral element for separating the light coming from the restrictor with respect to wavelength;

a photo-detector including a plurality of elementary photo-sensors for measuring the light separated by the spectral element;

a camera for taking a picture of the sample;

an input device for an operator to input a command;

a window generator for generating an image of a window having a size that corresponds to the command from the input device;

a superimposer for superimposing the image of the window on the picture of the sample; and a measurement size controller for changing the focal length of the focusing element according to the size of the window.

2. The spectrophotometer according to claim 1, wherein the focusing element is a zoom lens whose focal length is continuously variable.

3. The spectrophotometer according to claim 1, wherein the focusing element is a lens unit whose focal length is changed stepwise.

4. The spectrophotometer according to claim 1, wherein the focusing element is a set of exchangeable lens units having different focal lengths.

5. A colorimeter using the spectrophotometer according to claim 1.

6. A spectrophotometer, comprising:

a light source for casting a light on a sample;

a focusing element for focusing the light from the sample on a focal plane;

a restrictor placed on the focal plane for restricting an area of the light from the focusing element;

a spectral element for separating the light coming from the restrictor with respect to wavelength;

a photo-detector including a plurality of elementary photo-sensors for measuring the light separated by the spectral element;

a moving mechanism for changing the distance between the sample and an optical system including the light source, the focusing element, the restrictor, the spectral element and the photo-detector;

a camera for taking a picture of the sample;

an input device for an operator to input a command;

a window generator for generating an image of a window having a size that corresponds to the command from the input device;

a superimposer for superimposing the image of the window on the picture of the sample; and a measurement size controller for changing the distance between the sample and the optical system according to the size of the window.

7. A colorimeter using the spectrophotometer according to claim 6.

8. A colorimeter, comprising:

a spectrophotometer including:

a light source for casting a light on a sample;

a focusing element having a variable focal length for focusing the light from the sample on a focal plane;

a restrictor placed on the focal plane for restricting an area of the light focused on the focal plane;

a spectral element for separating the light coming from the restrictor with respect to wavelength;

a photo-detector including a plurality of elementary photo-sensors for measuring the light separated by the spectral element;

a camera for taking a picture of the sample;

an input device for an operator to input a command;

a window generator for generating an image of a window having a size that corresponds to the command from the input device;

a superimposer for superimposing the image of the window on the picture of the sample; and a measurement size controller for changing the focal length of the focusing element according to the size of the window.

9. A colorimeter, comprising:

a spectrophotometer including:

a light source for casting a light on a sample;

a focusing element for focusing the light from the sample on a focal plane;

a restrictor placed on the focal plane for restricting an area of the light from the focusing element;

a spectral element for separating the light coming from the restrictor with respect to wavelength;

a photo-detector including a plurality of elementary photo-sensors for measuring the light separated by the spectral element;

a moving mechanism for changing the distance between the sample and an optical system including the light source, the focusing element, the restrictor, the spectral element and the photo-detector;

a camera for taking a picture of the sample;

an input device for an operator to input a command;

a window generator for generating an image of a window having a size that corresponds to the command from the input device;

a superimposer for superimposing the image of the window on the picture of the sample; and a measurement size controller for changing the distance between the sample and the optical system according to the size of the window.

* * * * *